US009099909B2

(12) United States Patent
Li et al.

(10) Patent No.: US 9,099,909 B2
(45) Date of Patent: Aug. 4, 2015

(54) BRUSHED DIRECT CURRENT ELECTRIC MOTOR WITH SALIENT POLE ROTOR

(75) Inventors: Yue Li, Hong Kong (CN); Li Sheng Liu, Shenzhen (CN); Yong Qing Qi, Shenzhen (CN); Hong Jian Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 434 days.

(21) Appl. No.: 13/458,564

(22) Filed: Apr. 27, 2012

(65) Prior Publication Data

US 2012/0274170 A1 Nov. 1, 2012

(30) Foreign Application Priority Data

Apr. 28, 2011 (CN) .......................... 2011 1 0109452

(51) Int. Cl.
*H02K 13/00* (2006.01)
*H02K 13/04* (2006.01)
*H02K 13/06* (2006.01)
*H02K 23/00* (2006.01)
*H02K 25/00* (2006.01)
*H02K 23/36* (2006.01)
*H02K 23/20* (2006.01)
*H02K 23/18* (2006.01)
*H01R 39/04* (2006.01)

(52) U.S. Cl.
CPC ............... *H02K 25/00* (2013.01); *H01R 39/04* (2013.01); *H02K 23/00* (2013.01); *H02K 23/18* (2013.01); *H02K 23/20* (2013.01); *H02K 23/36* (2013.01); *H02K 13/00* (2013.01); *H02K 13/006* (2013.01); *H02K 13/04* (2013.01)

(58) Field of Classification Search
CPC ..... H01R 39/04; H02K 13/00; H02K 13/004; H02K 13/04; H02K 13/006; H02K 23/00; H02K 23/18; H02K 23/20; H02K 23/36; H02K 25/00

USPC ........... 310/40 MM, 156.08, 156.12, 156.15, 310/177, 232, 233
IPC ...................... H02K 13/00,13/04, 13/06, 23/00
See application file for complete search history.

(56) References Cited

U.S. PATENT DOCUMENTS

| | | | | |
|---|---|---|---|---|
| 3,042,819 A * | 7/1962 | Kennedy | .................... | 310/49.52 |
| 4,873,463 A * | 10/1989 | Jones | .......................... | 310/68 B |
| 4,949,023 A * | 8/1990 | Shlien | ........................... | 318/541 |
| 6,396,175 B2 | 5/2002 | Fujita et al. | | |
| 2003/0090165 A1 | 5/2003 | Ettridge | | |
| 2007/0046225 A1* | 3/2007 | Ahmed | ......................... | 318/254 |
| 2008/0129129 A1* | 6/2008 | Kori et al. | ...................... | 310/58 |
| 2009/0140590 A1* | 6/2009 | Hung | ....................... | 310/156.32 |
| 2010/0133940 A1* | 6/2010 | Grossmann et al. | ..... | 310/156.46 |
| 2012/0274170 A1* | 11/2012 | Li et al. | ......................... | 310/177 |

FOREIGN PATENT DOCUMENTS

JP          4200259 A      7/1992
JP       2006074906 A      3/2006

* cited by examiner

*Primary Examiner* — John K Kim
(74) *Attorney, Agent, or Firm* — Muncy, Geissler, Olds & Lowe, P.C.

(57) ABSTRACT

A brush direct current motor has a stator with a plurality of coils that correspond to a number of stator windings, a rotor with a number of poles, and a commutator. The commutator is connected to a first terminal of a direct current power source to convert the power into N phase alternating current. One end of each stator winding is connected to a respective phase of the alternating current via a brush and the other ends of the stator windings are connected to the second terminal of the direct current power source.

11 Claims, 7 Drawing Sheets

# BRUSHED DIRECT CURRENT ELECTRIC MOTOR WITH SALIENT POLE ROTOR

CROSS REFERENCE TO RELATED APPLICATIONS

This non-provisional patent application claims priority under 35 U.S.C. §119(a) from Patent Application No. 201110109452.X, filed in The People's Republic of China on Apr. 28, 2011.

FIELD OF THE INVENTION

This invention relates to electric motors and in particular, to a direct current motor having a commutator and a rotor having poles made of magnetically conductive material.

BACKGROUND OF THE INVENTION

Direct current electric motors having a permanent magnet rotor, wound stator coils, a commutator and brushes are generally known as shown in U.S. Pat. No. 6,396,175. The commutator is used to convert the direct current power into three phase alternating current power to supply the stator coils. Current designs, like the mentioned patent, usually employ a permanent magnet rotor. However, the permanent magnet of the rotor requires a magnetizing step in the manufacturing process, which lowers the production efficiency of the motor.

The present invention aims to provide a new motor which can solve or at least mitigate the above mentioned problem.

SUMMARY OF THE INVENTION

Accordingly, in one aspect thereof, the present invention provides a brush direct current motor, comprising: a stator comprising a plurality of teeth and a plurality of coils wound around the teeth and corresponding to N phases; a rotor coupling the stator, the rotor comprising a shaft, a rotor core fixed to the shaft and P salient poles made of magnetically conductive material and protruding from the shaft toward the teeth; a first brush; N second brushes; and a commutator fixed to the shaft; wherein the commutator comprises a first conductive ring, P first bars extending from the first conductive ring; wherein the first brush is arranged to be electrically connected to a first terminal of a direct current power source and is arranged to make continuous sliding electrical contact with the first conductive ring, and the second brushes are arranged to make sliding electrical contact with the first bars; and wherein one end of each phase is respectively connected to one of the N second brushes, and the other ends of each phase are arranged to be electrically connected to a second terminal of the direct current power source.

Preferably, the number of the teeth is equal to N multiplied by the number of coils that generate a magnetic field when a single phase is energized, and P is equal to N minus two or to N plus two.

Preferably, the stator has 6 coils and 6 teeth, and the rotor has 4 poles, or the stator has 8 coils and 8 teeth, and the rotor has 6 poles.

Preferably, the sum of the central angle "A" corresponding to the first bar and the central angle "B" corresponding to the second brush is not less than the commutation angle β, where β=|360/T−360/M|, "T" represents the number of stator teeth, and "M" represents the number of rotor poles.

Preferably, the included angle "Ω" of adjacent second brushes satisfies the formula: Ω=β+K*α, wherein α=360/M, and K is an integer.

Preferably, the motor has a third brush and a switch, and the commutator has a second conductive ring spaced from the first conductive ring and plurality of second bars extending from the second conductive ring, the first bars and second bars are alternately arranged along a path of the second brushes; the third brush is arranged to make continuous sliding electrical contact with the second conductive ring; the first and third brushes are electrically connected to the first terminal of the direct current power source via the switch, the switch being configured to selectively connect either the first brush or the third brush to the first terminal of the direct current power source.

Preferably, the commutator has a cylindrical brush contact surface formed by the first and second conductive rings and the first and second bars extending in the axial direction of the shaft.

Alternatively, the commutator has a planar brush contact surface formed by the first and second conductive rings and the first and second bars extending in the radial direction of the shaft.

Preferably, the rotor poles are made of ferromagnetic material.

Preferably, the number of the teeth is equal to the number of coils and each coil is wound about a single respective tooth, and P is equal to N minus two or to N plus two.

Preferably, transition pads are disposed in the contact path of the second brushes between the first bars and the second bars to form a sliding contact surface for the second brushes.

In the above mentioned embodiments of the present invention, as the poles of the rotor are made of magnetically conductive material, the magnetizing step during manufacture is omitted and, compared to current electric motors, the production efficiency is higher.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
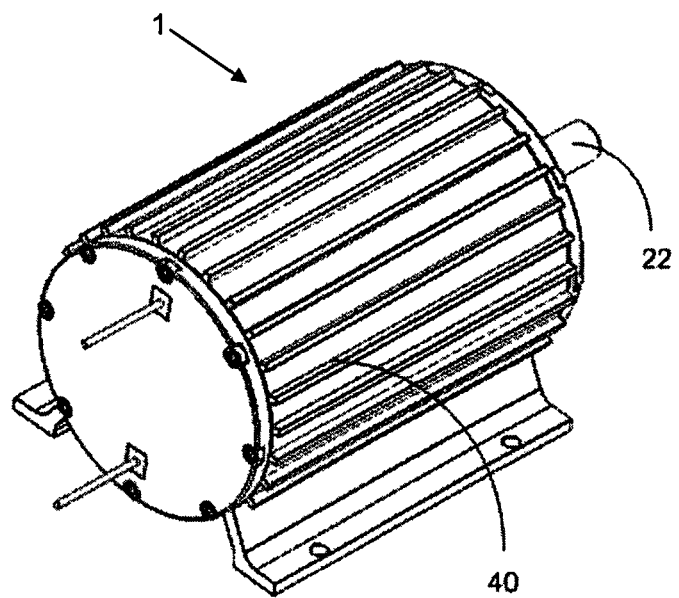
FIG. 1 is a perspective view of a brush direct current motor, according to a preferred embodiment of the present invention, the motor includes a stator, rotor, commutator and a number of brushes.
Figure 2:
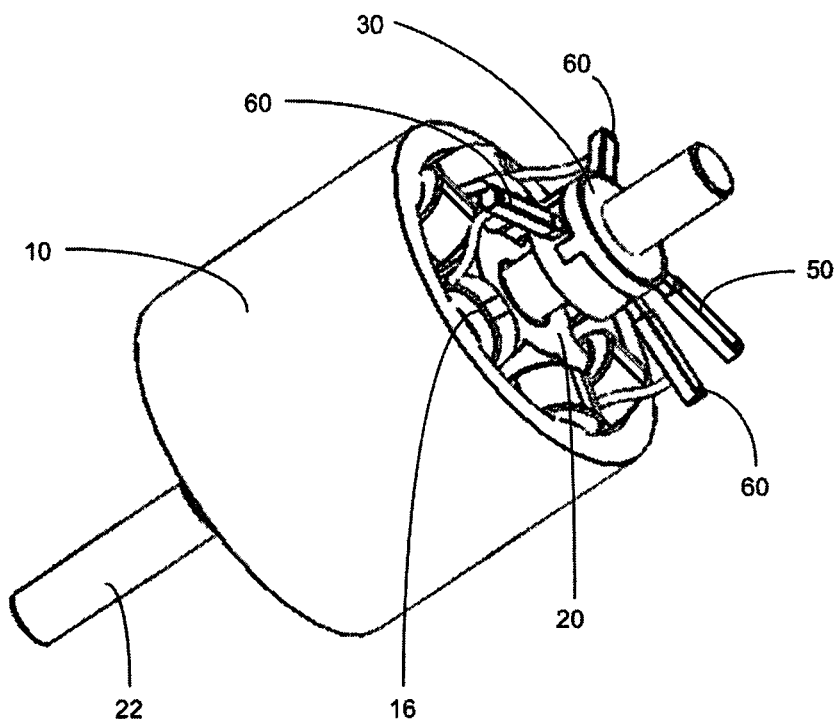
FIG. 2 shows the stator, rotor, commutator, and brushes of the motor of FIG. 1.
Figure 3:
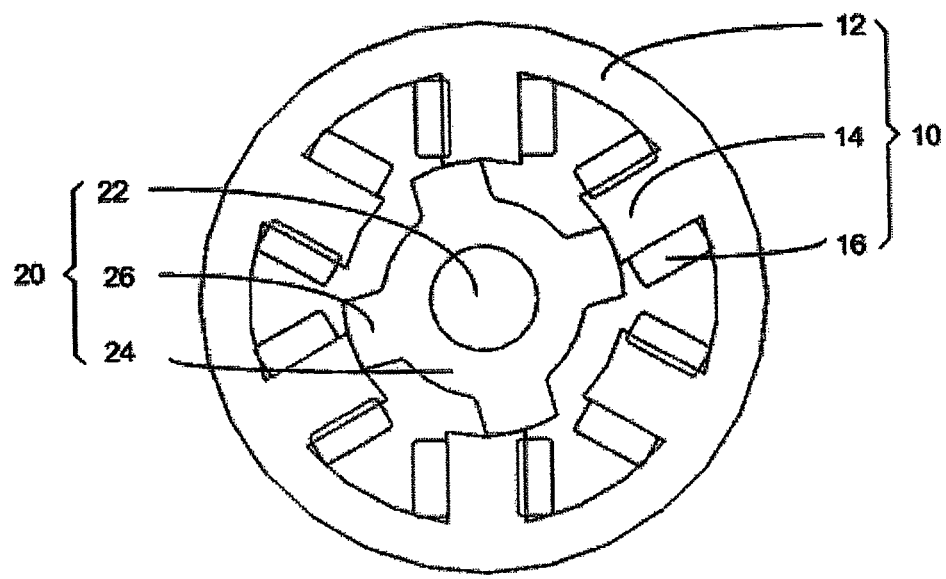
FIG. 3 is a schematic sectional view of the motor of FIG. 1.

Referring to FIGS. 1 to 5, a brush direct current motor 1, according to a first embodiment of the present invention, includes a stator 10, a rotor 20, a commutator 30, a casing 40, a first brush 50, and a number of second brushes 60. A brush direct current motor refers to a DC motor which has a commutator and a number of brushes arranged to make sliding electrical contact with the commutator.

The stator 10 includes a circular yoke 12, a number of teeth 14, and a number of coils 16. The yoke 12 is fixed to the inner surface of the casing 40, preferably as a press fit. The teeth 14 protrude from the inner surface of the yoke 12. The coils 16 correspond to a number of phases and are wound around corresponding teeth 14. In the present embodiment, the stator 10 has six teeth 14 and there are 6 coils 16 are made of aluminum wire. Each phase comprises two coils wound about two diagonally opposite teeth. The coils may be connected in series or parallel, depending on the application.

The rotor 20 is arranged or located inside the stator 10, including a shaft 22 and a rotor core 24 fixed to the shaft 22. The rotor core 24 includes a number of salient poles 26 protruding outwardly and facing the teeth 14. The poles 26 are made of magnetically conductive material, such as ferromagnetic material. In the present embodiment, the rotor has 4 salient poles 26.

Figure 4:
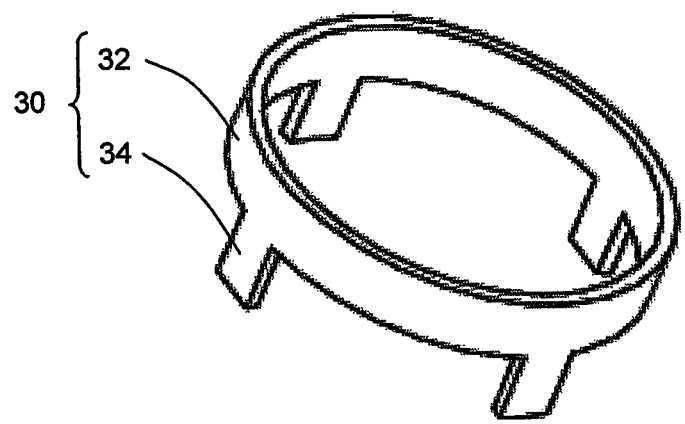
FIG. 4 shows a conductive ring, being a part of the commutator of FIG. 2.

The commutator 30 is fixed to the shaft 22 and includes an insulating body supporting a number of commutator elements, including a first circular conductive ring 32 and a number of first bars 34. The first conductive ring 32 is arranged to be coaxial with the shaft and extends axially along the shaft 22. The first bars 34 extend axially from the first conductive ring 32 and are arranged at equally spaced intervals in the circumferential direction of the shaft 22. Preferably, as shown in FIG. 4, the first bars 34 are integrally formed with the first conductive ring 32 as a single piece stamping. The circumferential gap between adjacent first bars 34 may be filed with insulating material such as thermosetting plastic material used to form the commutator base so as to form a smooth cylindrical surface for the second brushes 60. Alternatively, a purpose supplied transition pad may be provided as a sliding surface for the second brushes so as to provide a relatively smooth transition from one first bar to the next. This may be in the form of copper plates, fixed to the commutator base and insulated from the first bars and each other. In the present embodiment, the commutator 30 includes four first bars 34.

Each brush is slidably received in a brush cage. The brush cage of the first brush 50 is fixed to the casing 40 (preferably via a brush card not shown) so as to extend in the radial direction of the shaft 22 to make continuous sliding contact with the first conductive ring 32. The brush cages for the second brushes 60 are fixed so as to extend in the radial direction of the shaft 22 and make intermittent sliding contact with the first bars 34 as the rotor 20 turns. In the present embodiment, there are three second brushes 60, supplying 3 phase power to 3 windings, each winding comprising 2 coils 16 connected in series.

Figure 5:
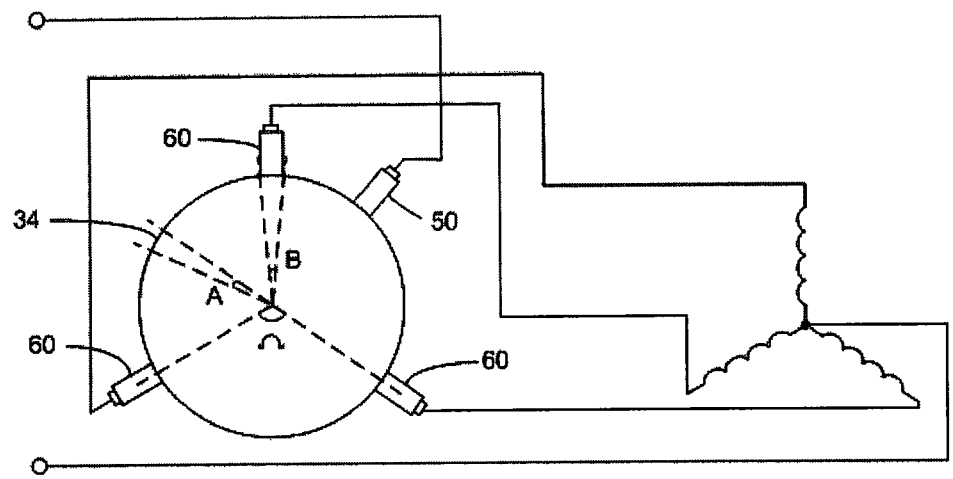
FIG. 5 is a schematic wiring diagram showing the electrical connection between the brushes and the stator winding of the motor of FIG. 1.

Referring to FIG. 5, the sum of the central angle "A" corresponding to the first bar 34 and the central angle "B" corresponding to the second brush 60 is not less than the commutation angle $\beta$, wherein $\beta=|360/T-360/M|$, where "T" represents the number of stator teeth 14, and "M" represents the number of rotor poles 26. The included angle "Ω" of adjacent second brushes 60 satisfies the formula: $\Omega=\beta+K*\alpha$, wherein the equivalent position angle $\alpha=360/M$, and K is an integer. In the present embodiment, "K" is equal to 1, "$\beta$" is equal to 30 degrees, "A" and "B" both are substantially equal to 15 degrees, "$\alpha$" is equal to 90 degrees, and therefore the "Ω" is equal to 120 degrees. The equivalent position angle $\alpha$ corresponds to the circumferential spacing of the first bars.

The first brush 50 is configured to be electrically connected to a first terminal of a direct current power source (not shown), for example, the positive terminal. One end of each phase is connected to a respective second brush 60, while the other ends of each phase are connected together forming a star point to be connected to the other, second terminal of the direct current power source, for example, the negative terminal. Thus the number of second brushes 60 corresponds to the number of phases.

In operation, positive direct current power, flows from the positive terminal to the negative terminal, for example, via the first brush 50, the first conductive ring 32, the first bar 34, the second brushes 50, the coils 16, and the star connection point, so that every two diagonally opposite coils 16 are provided with unipolar current excitation, preferably being connected in series. As such, the coils 16 cooperatively generate a rotating magnetic field and the rotor 20 is forced to rotate. Compared to prior art electric motors having permanent magnet rotors, as the poles 26 of the rotor 20 are made of magnetically conductive material, the magnetizing step during manufacture is omitted and it is therefore obvious that the production efficiency is relatively high. Meanwhile, the motor only employs four brushes, which result in a relatively simple configuration of the motor.

Figure 6:
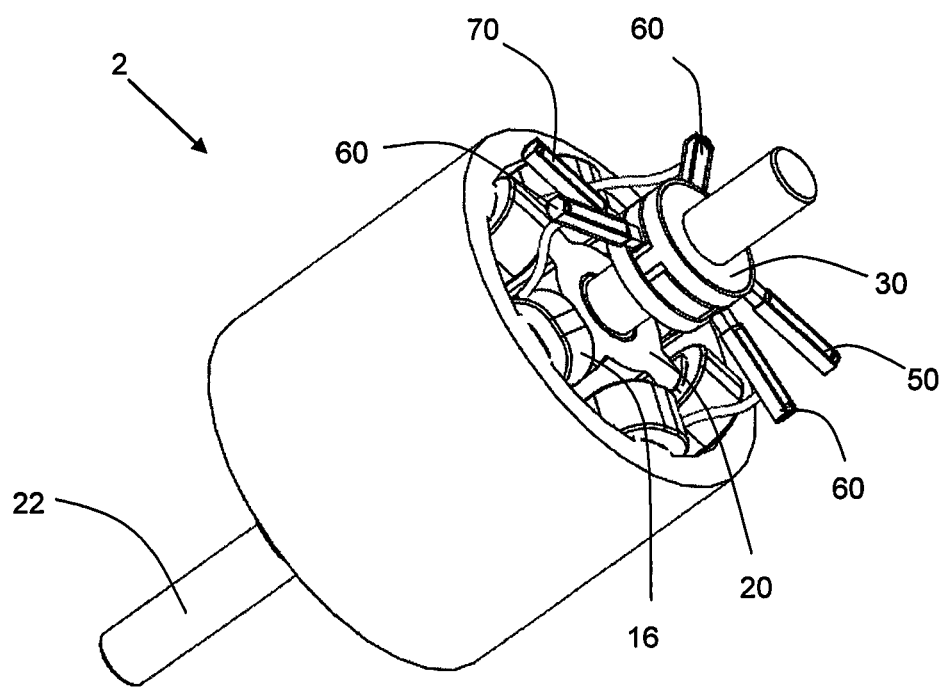
FIG. 6 shows a stator, rotor, commutator and brushes of a motor according to a second embodiment of the present invention.
Figure 7:
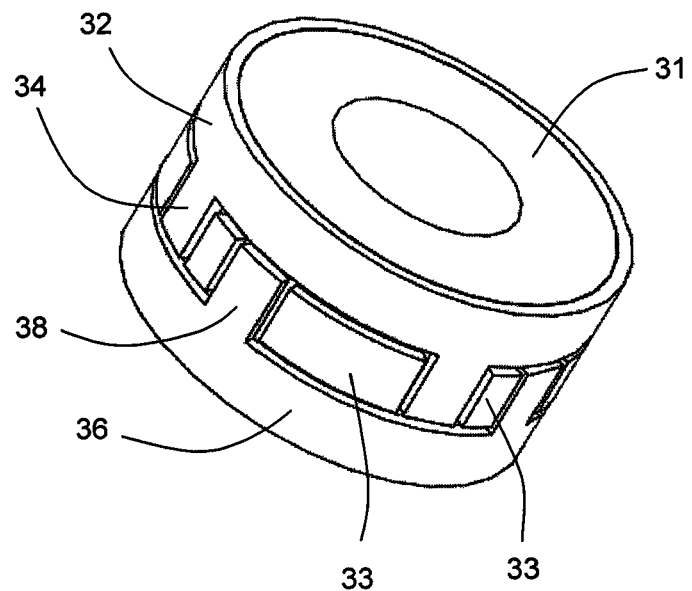
FIG. 7 shows the commutator of the motor of FIG. 6.
Figure 8:
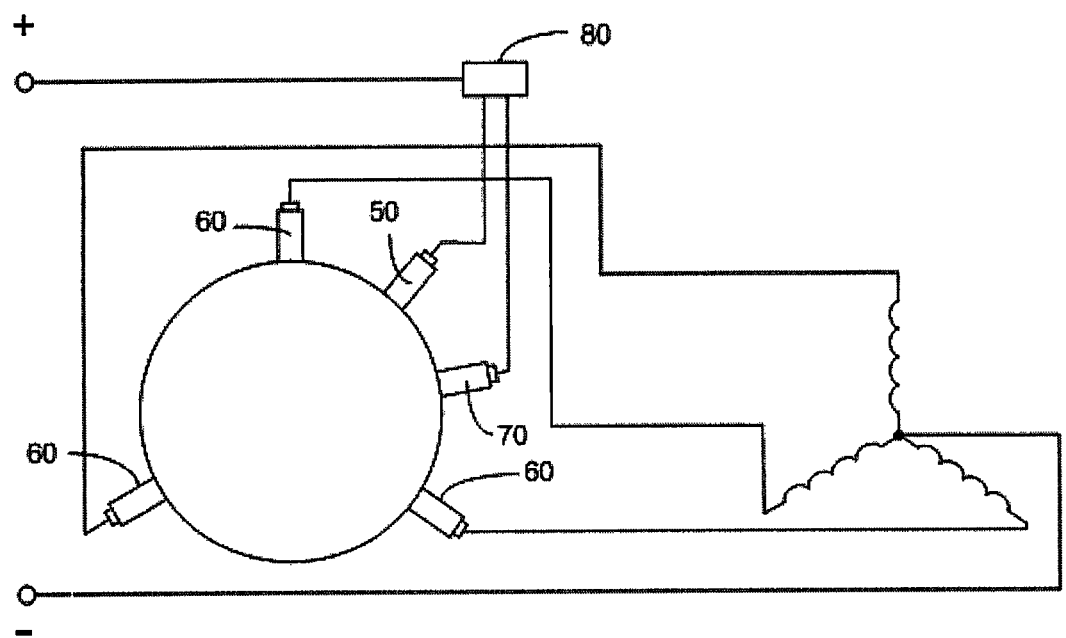
FIG. 8 is a schematic wiring diagram showing the electrical connection between the brushes and the stator winding of the motor of FIG. 6.
Figure 9:
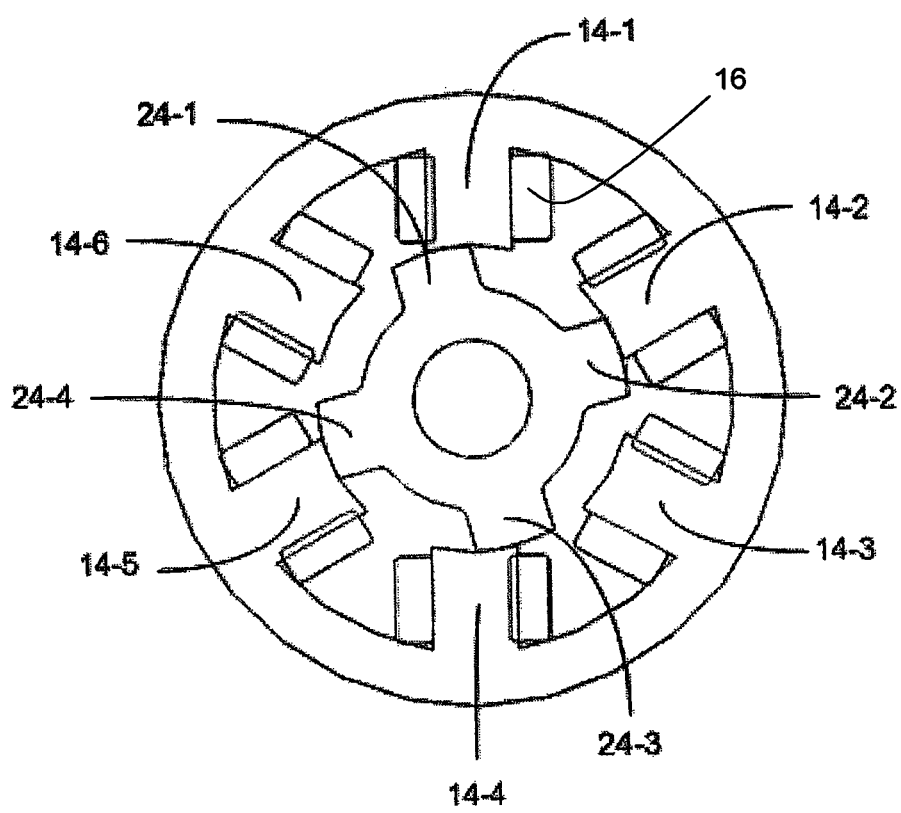
FIG. 9 is a schematic sectional view of the motor of FIG. 6.

Referring to FIGS. 6 to 8, in accordance with a second embodiment of the present invention, a motor 2 is provided. Compared to the motor 1 of the first embodiment, the motor 2 further includes a third brush 70 and a switch 80, and the commutator further includes a second circular conductive ring 36 and a number of second bars 38, fixed to the commutator body 31 and extending axially from the second ring and equally spaced about the second ring.

The first and second conductive rings 32 and 36 are spaced along commutator body 31 in the axial direction of the shaft 22. The second bars 38 extend axially from the second conductive ring 36. Preferably, the second bars are integrally formed with the second ring as a single piece stamping. The first and second bars 34 and 38 are alternately arranged at spaced intervals in the circumferential direction of the shaft 22. Transition pads 33 are placed between the first and second bars along the contact path of the second brushes to provide a sliding surface for the second brushes between the bars. According to the above described embodiment, there are four second bars 38. As such, at any position, two second brushes 60 are respectively connected to a first bar 34 and a second bar 38. The brush cages of the third brush 70 is fixed to the casing 40 so as to extend in the radial direction of the shaft 22 to make continuous sliding contact with the second conductive ring 36. The first and third brushes 50 and 70 are electrically connected to the first terminal of the direct current power source via the switch 80, for example, the positive terminal. The switch 80 connects either the first brush 50 or the third brush 70 to the first terminal of the power source.

In operation, when the first brush 50 is connected to the direct current power source, the coils 14-1, 14-4, for example, are firstly energized to generate a magnetic field. This magnetic field attracts the poles 26-1, 26-3. As the rotor turns, coils 14-3 and 14-6 are energized to generate a magnetic field to attract the poles 24-2, 24-4 and coils 14-1 and 14-4 are de-energized. After that, coils 14-2, 14-5 are energized to generate a magnetic field to attract the poles 24-1, 24-3 and coils 14-2 and 14-5 are de-energized. Thus the rotor 20 rotates clockwise. In the other situation when the third brush 70 is connected to the direct current power source, the coils 14-2, 14-5, for example, are firstly energized to generate a magnetic field to attract the poles 24-2, 24-4. Then, as the rotor turns the coils 14-3, 14-6 are energized to generate a magnetic field to attract the poles 24-1, 24-3 and the coils 14-2 and 14-5 are de-energized, then coils 14-1, 14-4 are energized to generate a magnetic field to attract the poles 24-2, 24-4 and the coils 14-3 and 14-6 are de-energized. Thus the rotor 20 rotates counterclockwise. As such, the motor 2 can be conveniently controlled to rotate in either direction by switching the switch 80. Compared to prior art designs, although the motor 2 includes five brushes, it only needs one switch 80 to change the direction of rotation of the motor and therefore the configuration is still simple.

The first and second conductive rings 32 and 36, the first and second bars 34 and 38, and the first to third brushes 50 to 70 function as a current converting device for converting the current supplied from a direct current power source to an N phase alternating current used to energize the stator windings, in cooperation with the rotation of the rotor. However, it should be understood that the commutator 30 is not limited to the construction illustrated in the present embodiments.

Figure 10:
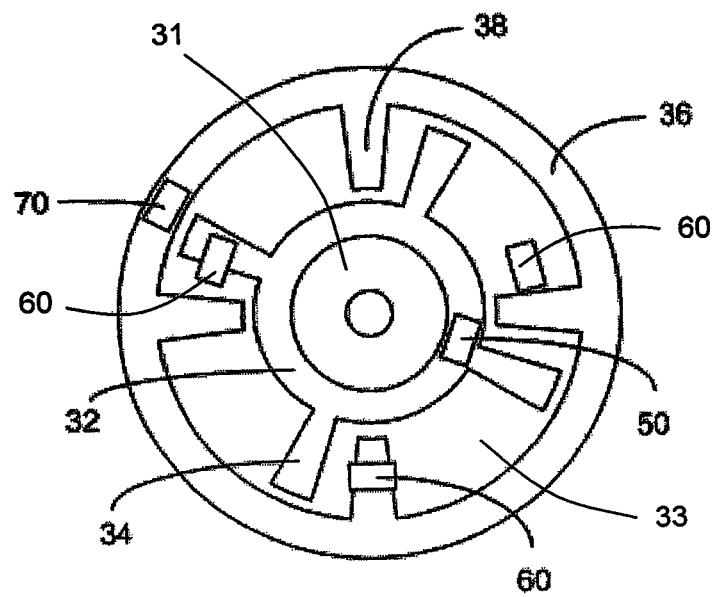
FIG. 10 is a plan view of a commutator, according to a third embodiment of the present invention.

For example, in another embodiment, as shown in FIG. 10, the commutator may have a planar contact surface, compared to the cylindrical contact surface of the commutator of the first and second embodiments. The first conductive ring 32 is fixed to the commutator body 31 adjacent the shaft 22 and the first bars 34 extend radially outwardly from the first conductive ring. The first bars 34 and the second bars 38 are thus arranged alternately along the contact path of the second brushes 60. The commutator body 31 supports the commutator elements, namely the first conductive ring 32, the first bars 34, the second conductive ring 36 and the second bars 38 so as to form a flat or planar contact surface for the brushes. Transition pads 33 may be disposed in the gaps in the brush path for the second brushes between the bars 34, 38, to smoothen the brush path. As in the previous embodiments the transition pads 33 may be purpose supplied pieces or may be part of the commutator body 31. Preferably, the commutator body is formed from an insulating material such as thermosetting plastic. In this embodiment, all of the brushes 50, 60 and 70 extend in the axial direction of the shaft 22 and are arranged radially spaced from the shaft to make sliding contact with respective conductive rings 32, 36, or the bars 34, 38.

Figure 11:
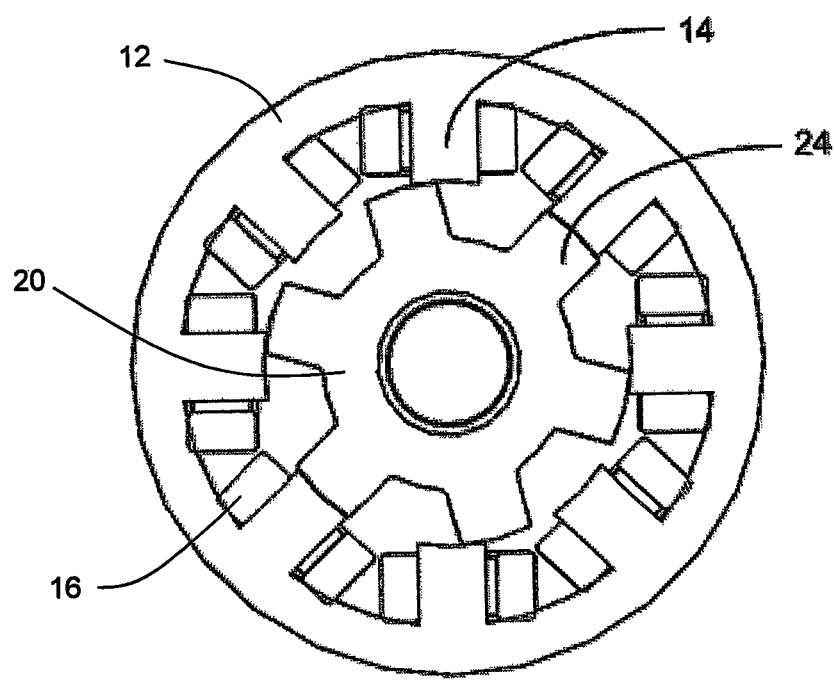
FIG. 11 is a schematic sectional view of a motor, according to a fourth embodiment of the present invention.
Figure 12:
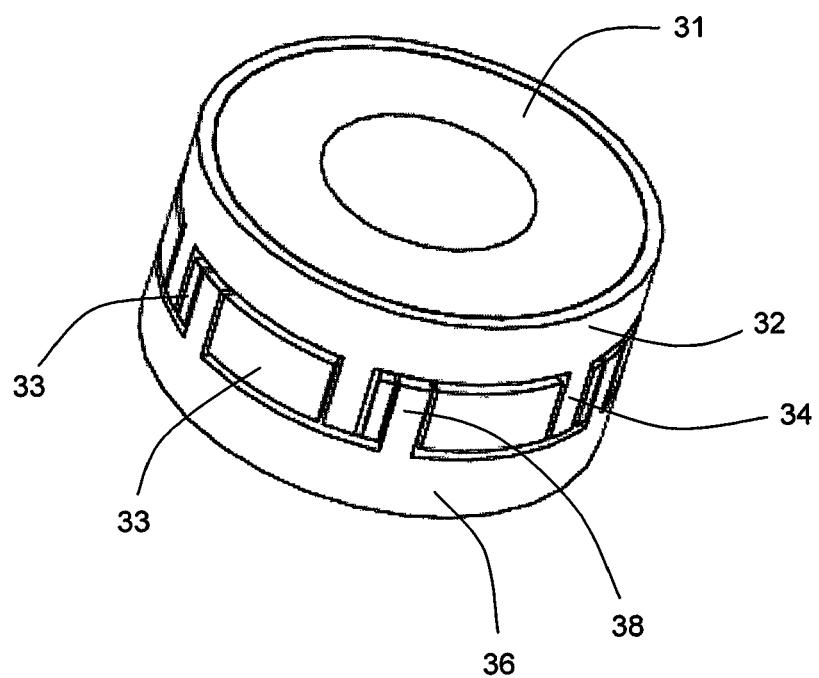
FIG. 12 shows a commutator for the motor of FIG. 11.

It should be understood that the number of stator teeth 14 and rotor poles 26 are not limited to the above described embodiments. It was found that when the number of stator teeth 14 is equal to the number of stator winding phases multiplied by the number of coils 16 of a single phase, and the number of the poles 26 is equal to the number of teeth 14 less two or plus two, the efficiency of the motor 1 will be higher. For example, the motor can have 8 teeth 14 and 6 poles, with 4 phases and 2 coils per phase as shown in FIGS. 11 and 12. The motor can also have 8 teeth 14 and 10 poles, or 6 teeth and 8 poles. For a motor with a single tooth winding and each tooth having a single coil wound there on as shown in the described embodiments, the number of teeth is, of course, equal to the number of coils.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brush direct current motor, comprising:
a stator comprising a plurality of teeth and a plurality of coils wound around the teeth and corresponding to N phases;
a rotor coupling the stator, the rotor comprising a shaft, a rotor core fixed to the shaft and P salient poles made of magnetically conductive material and protruding from the shaft toward the teeth;
a first brush;
N second brushes; and
a commutator fixed to the shaft;
wherein the commutator comprises a first conductive ring, P first bars extending from the first conductive ring;
wherein the first brush is arranged to be electrically connected to a first terminal of a direct current power source and is arranged to make continuous sliding electrical contact with the first conductive ring, and the second brushes are arranged to make sliding electrical contact with the first bars; and
wherein one end of each phase is respectively connected to one of the N second brushes, and the other ends of each phase are arranged to be electrically connected to a second terminal of the direct current power source,
wherein the sum of the central angle "A" corresponding to the first bar and the central angle "B" corresponding to the second brush is not less than the commutation angle "β", where β=|360/T−360/M|, "T" represents the number of stator teeth, and "M" represents the number of rotor poles.

2. The motor of claim 1, wherein the stator has 6 coils and 6 teeth, and the rotor has 4 poles.

3. The motor of claim 1, wherein the stator has 8 coils and 8 teeth, the rotor comprises 6 poles.

4. The motor of claim 1, wherein the included angle "Ω" of adjacent second brushes satisfies the formula: Ω=β+K*α, wherein α=360/M, and K is an integer.

5. The motor of claim 1 further comprising a third brush and a switch, wherein the commutator comprises a second conductive ring spaced from the first conductive ring and plurality of second bars extending from the second conductive ring, the first bars and second bars are alternately arranged along a path of the second brushes; the third brush is arranged to make continuous sliding electrical contact with the second conductive ring; the first and third brushes are electrically connected to the first terminal of the direct current power source via the switch, the switch being configured to selectively connect either the first brush or the third brush to the first terminal of the direct current power source.

6. The motor of claim 5, wherein the commutator has a cylindrical brush contact surface formed by the first and second conductive rings and the first and second bars extending in the axial direction of the shaft.

7. The motor of claim 5, wherein the rotor poles are made of ferromagnetic material.

8. The motor of claim 7, wherein the number of the teeth is equal to the number of coils and each coil is wound about a single respective tooth, and P is equal to N minus two or to N plus two.

9. The motor of claim 8, wherein transition pads are disposed in the contact path of the second brushes between the first bars and the second bars to form a sliding contact surface for the second brushes.

10. The motor of claim 1, wherein the number of the teeth is equal to N multiplied by the number of coils that generate a magnetic field when a single phase is energized, and P is equal to N minus two or to N plus two.

11. The motor of claim 5, wherein the commutator has a planar brush contact surface formed by the first and second conductive rings and the first and second bars extending in the radial direction of the shaft.

\* \* \* \* \*